(12) United States Patent
Diestel et al.

(10) Patent No.: US 11,651,049 B2
(45) Date of Patent: May 16, 2023

(54) CLUSTER ANALYSIS BASED ON TANGLES IN ABSTRACT SEPARATIONS SYSTEMS

(71) Applicants: Universitat Hamburg, Hamburg (DE); Victoria Link Limited, Wellington (NZ)

(72) Inventors: Reinhard Diestel, Hamburg (DE); Geoffrey Whittle, Wellington (NZ)

(73) Assignees: Universitat Hamburg, Hamburg (DE); Victoria Link Limited, Wellington (NZ)

( * ) Notice: Subject to any disclaimer, the term of this patent is extended or adjusted under 35 U.S.C. 154(b) by 199 days.

(21) Appl. No.: 16/092,781

(22) PCT Filed: Apr. 13, 2017

(86) PCT No.: PCT/EP2017/058954
§ 371 (c)(1),
(2) Date: Oct. 11, 2018

(87) PCT Pub. No.: WO2017/178598
PCT Pub. Date: Oct. 19, 2017

(65) Prior Publication Data
US 2019/0130211 A1    May 2, 2019

(30) Foreign Application Priority Data

Apr. 13, 2016 (DE) ...................... 10 2016 004 339.3

(51) Int. Cl.
*G06V 10/62* (2022.01)
*G06F 18/23213* (2023.01)
(Continued)

(52) U.S. Cl.
CPC ........ *G06F 18/23213* (2023.01); *G06F 17/10* (2013.01); *G06F 18/22* (2023.01); *G06V 30/1988* (2022.01)

(58) Field of Classification Search
None
See application file for complete search history.

(56) References Cited

U.S. PATENT DOCUMENTS

2006/0215923 A1*  9/2006  Beatty ...................... G06T 9/00
                                                              382/253

OTHER PUBLICATIONS

Robertson, Neil, and Paul D. Seymour. "Graph minors. IX. Disjoint crossed paths." Journal of Combinatorial Theory, Series B 49.1 (1990): 40-77. (Year: 1990).*

(Continued)

*Primary Examiner* — Sean M Conner
(74) *Attorney, Agent, or Firm* — Greer, Burns & Crain, Ltd.

(57) ABSTRACT

A computer-implemented method to capture and detect clusters in, or determined by, a set V of discrete digital data comprising; computing, from the set V, an abstract separation system ASS that consists of a finite set S, whose elements are called separations; of a predetermined transitive, antisymmetric and reflexive order relation ≤ on S; and of an order-reversing involution *: S→S, that is, a mapping s→s* with the property that, (s*)*=s and that r≤s implies s*≤r* for all r, s∈S; predetermining a set of consistency requirements (CRs), that is, a set F of subsets of S; computing, from the ASS (S,≤, *), one or more abstract tangles, that is, any set T⊆S that contains exactly one of each pair {s, s*} for s∈S, and does not contain any of the forbidden configurations F∈F as a subset; or determining that there is no abstract tangle; and determining that any abstract tangle T represents a cluster in, or determined by, the data set V.

15 Claims, 3 Drawing Sheets

Upper left quadrant: pixels of various shades of dark green; lower left quadrant: various shades of bright green; upper right quadrant: various shades of bright red; lower left quadrant: various shades of dark red. There are two abstract tangles, each refined by two abstract tangles of larger complexity.

(51) Int. Cl.
G06F 17/10 (2006.01)
G06V 30/196 (2022.01)
G06F 18/22 (2023.01)

(56) References Cited

OTHER PUBLICATIONS

Geelen, Jim, Bert Gerards, and Geoff Whittle. "Tangles, tree-decompositions and grids in matroids." Journal of Combinatorial Theory, Series B 99.4 (2009): 657-667. (Year: 2009).*
International Search Report and Written Opinion issued for International Application No. PCT/EP2017/058954, dated Jul. 28, 2017, 10 pages.
Reinhard Diestel et al: "Profiles of separations: in graphs, matroids and beyond (version 3)", Preprint, Mar. 21, 2016 (Mar. 21, 2016), pp. 1-29, XP055392769, Retrieved from the Internet: URL: http://arxiv.org/pdf/1110.6207v3.pdf.
Reinhard Diestel et al: "Tangles and the Mona Lisa (version 1)", Preprint, Mar. 22, 2016 (Mar. 22, 2016), pp. 1-13, XP055392774, Retrieved from the Internet: URL: https://arxiv.org/pdf/1603.06652v1.pdf.
Reinhard Diestel et al: "Tangles and the Mona Lisa (version 2)", Preprint, Apr. 14, 2016 (Apr. 14, 2016), pp. 1-19, XP055392775, Retrieved from the Internet: URL: https://arxiv.org/pdf/1603.06652v2.pdf.
Reinhard Diestel et al: "Tangle-tree duality: in graphs, matroids and beyond", ariv.org, Cornell University Library, 201 Olin Library Cornell University Ithaca< NY 14853, Jan. 10, 2017 (Jan. 10, 2017), pp. 1-27, XP080740650.
M. Ester, H. Kriegel, J. Sander and X. Xu, "A density-based algorithm for discovering clusters in large spatial databases with noise," Proc. Second International Conference on Knowledge Discovery and Data Mining (AAAI Press., 1996), 226-231.
Fu, Y et al: "Locally adaptive subspace and similarity metric learning for visual data clustering and retrieval", Computer Vision and Image Understanding, Academic Press, US, vol. 110, No. 3, Jun. 2008 (Jun. 2008), pp. 390-402, XP022652947, ISSN: 1077-3142, DOI:10.1016/J.CVIU.2007.09.017.
J. MacQueen, Some methods for classification and analysis of multivariate observations, Proc. Fifth Berkeley Symp. on Math. Statist. and Prob., vol. 1 (Univ of Calif. Press, 1967), 281-297.
Tang, Yibin et al: "Image denoising via sparse coding suing eigenvectors of graph Laplacian", Digital Signal Processing, Academic Press, Orlando, FL, US, vol. 50, Jan. 6, 2016 (Jan. 6, 2016), pp. 114-122, XP029417395, ISSN: 1051-2004, DOI:10.1016/J.DSP.2015.12.013.

* cited by examiner

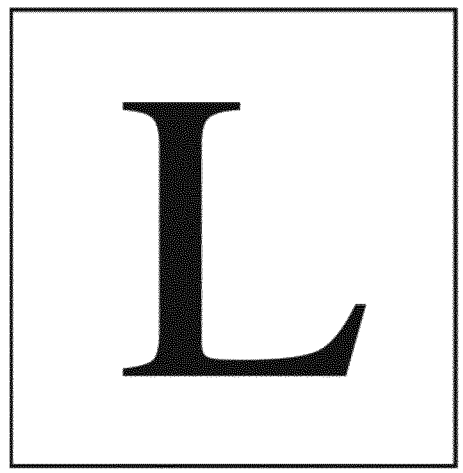
Figure 1: An image of an object
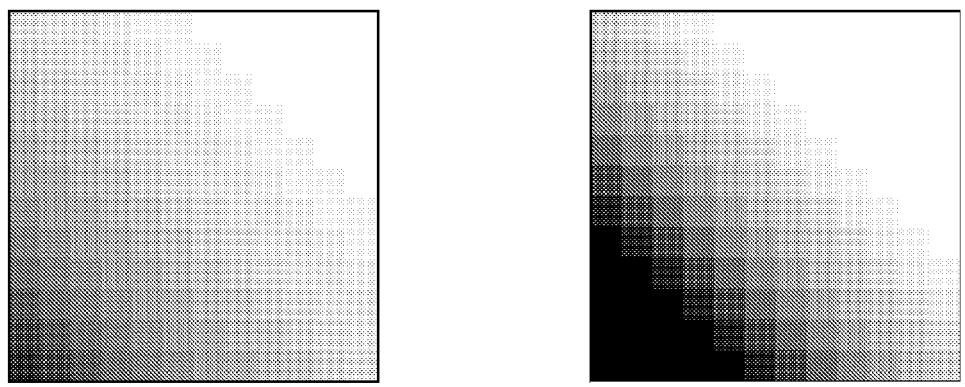
Figure 2: Pixellated gradients: no visible abstract tangle on the left, two on the right

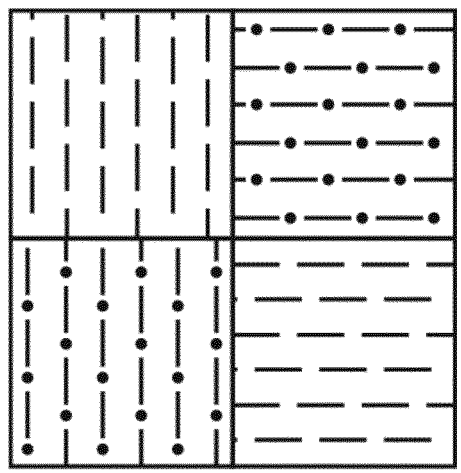

Figure 3: Upper left quadrant: pixels of various shades of dark green; lower left quadrant: various shades of bright green; upper right quadrant: various shades of bright red; lower left quadrant: various shades of dark red. There are two abstract tangles, each refined by two abstract tangles of larger complexity.

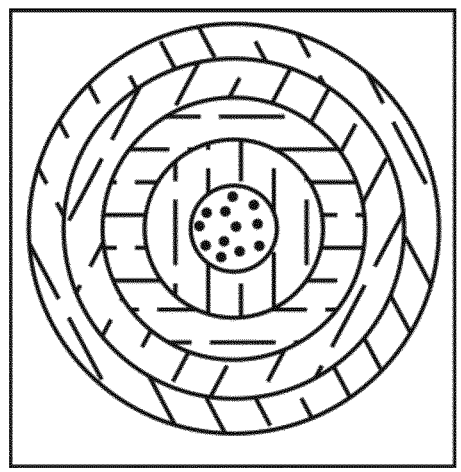

Figure 4: Dotted inner disc in yellow, concentric rings in different hues of red, on blue background. Concentric circles have low order, radial separations have high order.

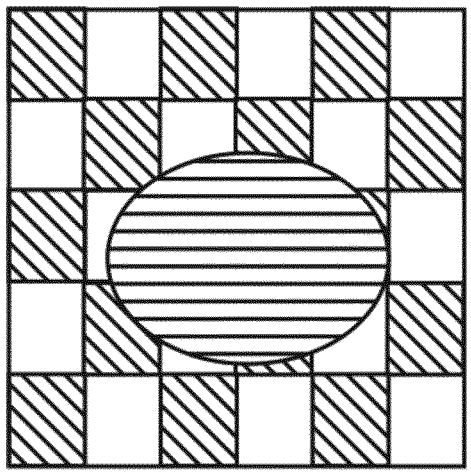
Figure 5: Red disc on checkered background of small green and white squares. Only one abstract tangle of high coherence.
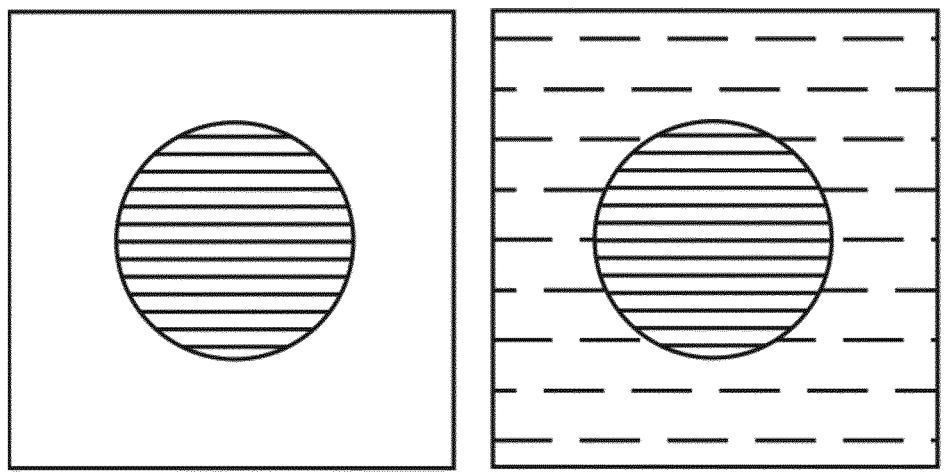
Figure 6: Left: blue disc on white background; right: blue disc on background consisting of randomly blue or white pixels. Two abstract tangles on the left, only one on the right.

CLUSTER ANALYSIS BASED ON TANGLES IN ABSTRACT SEPARATIONS SYSTEMS

CROSS-REFERENCE TO RELATED APPLICATIONS

This application represents the national stage entry of International Application PCT/EP2017/058954, filed Apr. 13, 2017, which claims the benefit of German Application 102016004339.3, filed Apr. 13, 2016. The contents of both applications are hereby incorporated by reference as set forth in their entirety herein.

1 INTRODUCTION

The invention provides a method to detect, represent and analyse clusters in data, or anywhere in reality but described indirectly by a data set, by means of a computer. Clusters in data are usually described as sets of data points that are similar or tightly linked to each other. Clusters in a set of abstract objects can be described indirectly by data sets indicating how these objects are related.

Cluster identification and analysis has known applications in areas such as data mining, expert systems, knowledge bases, signal processing or image analysis. More recent applications include the analysis of internet content, for marketing purposes or information quality assurance, say, such as trend identification and fact checking.

1.1 Comparison to Other Clustering Methods

The invention detects, or newly identifies, clusters in, or indirectly described by, a data set in a way that is markedly different from previous approaches. Two common clustering methods are k-means clustering and the DBSCAN method.

For background on k-means clustering see J. MacQueen, *Some methods for classification and analysis of multivariate observations*, Proc. Fifth Berkeley Symp. on Math. Statist. and Prob., Vol. 1 (Univ. of Calif. Press, 1967), 281-297. In k-means clustering the number of clusters, k, is chosen in advance and thus part of the input. The clusters itself are based on a distance function on the set of all data points. This distance function needs to be fixed in advance as well. Each data point is unambiguously assigned to a cluster.

For background on DBSCAN see M. Ester, H. Kriegel, J. Sander and X. Xu, *A density-based algorithm for discovering clusters in large spatial databases with noise*, Proc. Second International Conference on Knowledge Discovery and Data Mining (AAAI Press., 1996), 226-231. In the DBSCAN method the number of cluster need not be fixed in advance. As in k-means clustering, however, the DBSCAN method also requires a distance measure on all data points and assigns individual data points precisely to clusters (or treats them as noise, in which case they are not assigned to any cluster).

In contrast, the method which the invention affords for cluster analysis in data sets does not require one to fix the number of clusters in advance, nor to specify a distance function between data points. Its clusters are not (precise) subsets of the data set but fuzzy objects that emerge from the interplay of the data points. In this sense they are better suited to deal with ambiguity in the data, situations in which individual data points cannot clearly be assigned to one cluster or another.

Over and above such known clustering methods, the invention can also be used to identify clusters in reality that are described by a data set only indirectly. Here, the data consists not of objects that form the clusters, but of information that points to the existence of clusters elsewhere, much as road signs can identify population clusters (towns) by pointing to them.

KEY CONCEPTS

In the invention clusters are captured in a novel way. The framework is highly versatile and can be adapted to many different types of data. As it is highly versatile, the language to describe it is very abstract. In the next section, the key concepts are introduced. How these can be applied and in which settings is laid out in Section 4.

To make the key concepts more easily digestible at first reading, a running commentary is provided that explains, by way of example, what the key concepts might look like when applied to image analysis. There, we assume that the image data is given in the form of a set P of pixels. Each pixel has an x-coordinate, a y-coordinate and furthermore a number of attributes such as brightness and colour. The aim then is to represent the features of the image, perhaps a tree in the foreground, a house in the background and so on, as clusters in the data.

We stress, however, that image analysis is by far not the only application field of the invention, nor the most important one. The example of image analysis is only chosen because in this setting some of the key concept can be most easily visualised.

2.1 Abstract Separation Systems (ASS)

A poset consists of a set S and a partial order $\leq$ on S. A partial order is a antisymmetric, reflexive and transitive binary relation. An abstract separation system, or ASS, is a triple $(S,\leq,*)$ consisting of a poset $(S,\leq)$ and a mapping $*: S \to S$ such that is an involution, that is, $(s^*)^*=s$ for all $s \in S$; and
is order-reversing, that is, $s \leq t$ implies $t^* \leq s^*$ for all $s, t \in S$.

The elements $s \in S$ are called separations.

What is the motivation for this definition? Features or clusters in a data set are fuzzy in the sense that it is not always clear which data point actually belongs to the cluster and which one not. In a digital image showing a face, it might not be possible to say whether a single pixel is part of the nose or whether it rather belongs to a cheek. If the entire data is split into two (possibly overlapping) parts, however, then, unless the split goes right across the cluster, it is far easier to decide in which of the two parts the majority of the cluster lies. If the face in the digital image is split into two parts along a line cutting along the cheek then the nose will be mostly in one part, even if some pixels are ambiguous and might be thought of as belonging to the nose or not.

Each separation s represents one way to split the data into two (possibly overlapping) parts and at the same time points towards one of the two parts. (The method, however, only needs the abstract poset to work—the separations may have to be computed from the data in a complex way.) The separation $s^*$ then represents the same split but points towards the other part. If $s<t$ then s and t point in the same general direction but t does so in a more specific way.

The bipartition model is a simple way to represent an ASS: here, the set S of separations consists of (some of the) partitions (A, B) of the underlying data set. In image analysis, for instance, A and B would be disjoint sets of pixels such that their union is the full set of pixels in the image. Normally, S would only consist of some of all the possible partitions. In particular, it almost never makes sense to consider partitions that cut across a lot of natural features in the image (or, more generally, the data set). The part B of the partition (A, B) should be considered as the part towards which (A, B) points. In an image, B could contain the nose, for example. The partial order in the bipartition model is defined as follows: if (A, B)∈S and (C, D)∈S then (A, B)≤(C, D) if and only if A⊆C and B⊇D.

Thus, if each of B and D contain the nose but D⊊B then D specifies the nose in a finer way. The involution * takes a simple form in the bipartition model: (A, B)*=(B, A) for every (A, B)∈S. The involution simply switches the sides of the partition. If (A, B) points towards the nose, then (A, B)* points away from the nose.

Often the abstract separation system will be embedded in a larger abstract separation system that allows for a unique supremum and a unique infimum of any two of its elements. An ASS (U,≤,*) is a universe if any two separations s, t∈S have a unique supremum, denoted by s∨t, and a unique infimum, denoted by s∧t. In mathematical terms, the poset forms a lattice. An abstract separation system (S,≤,*) that is embedded in a universe is submodular if for all s, t ∈ S at least one of s∨t and s∧t is also in S.

For the bipartition model there is a canonical universe: we let U be the set of all bipartitions (A, B) of the data set (the set of pixels in an image). The supremum is then (A, B)∨(C, D)=(A∪D,B∩D), and the infimum is (A, B)∧(C, D)=(A∩D,B∪D).

The bipartition model is by far not the only possible instance of an ASS, even one designed to describe clusters in a data set rather than clusters elsewhere only indicated by the data. Other types of data will require other models. There, it might be more advantageous to consider pairs (A, B) of subsets A, B of the data set V such that A∪B V but for which A and B are allowed to overlap, that is, such that A∩B is non-empty.

As an example, consider the setting of a consumer survey. Consumers are asked a series of questions, such as "Do you like cats?" or "Do you recycle paper?", with possible answers "yes", "no" and "don't know". Then each question may define a separation of the set V of consumers polled into (A,B), where A is the set of consumers that answered "yes" or "don't know", while B is the set of consumers that answered "no" or "don't know". Thus the set A∩B consists of those consumers that are unsure about this particular question.

An example where clusters in reality are described only indirectly by the data set to be analysed is that the clusters are trends in public discourse, topical issues of current debate, and the data consists of internet pages that people have published. Keywords in the public debate—or, provisionally any words used in these pages—then define the separations in an ASS. For example, we may think of the word Brexit as 'separating' those internet pages where the relationship between the UK and the EU is discussed from other pages where this is not the case. Our method is able to identify the word 'Brexit' as a critical such separation, a keyword, while noticing that ordinary words such as 'and' or 'often' are not keywords. The method is then able to identify as clusters the most topical issues, and describe the structure that these form with each other, such as in sub-issues or unrelated issues. Note that these clusters are not merely subsets of the set of data analysed (in this case, a set of internet pages), even fuzzy ones, but abstract issues of much greater importance. All the same, the analysis of internet pages which our method affords can help identify these issues.

In a related example, the elements of an ASS might be statements or beliefs, the partial ordering being that of implication. Our method can identify beliefs on which there is a high level of consensus, telling them apart from more contentious statments, even when such beliefs are fuzzy in that they do not consist of any clearly identifiable simple set of dogmatic statements. Universally held beliefs will appear as clusters, while non-truths may appear as clusters of a different kind (if they have a following), or not be clusters. This may help with the identification of fake news, to narrow down the vast number of claims made on the internet to a few contentious ones that can then be humanly checked.

In short, the way in which the separations of an ASS arise is a critical ingredient for any particular application, and may be quite complex. The method, however, will work with any type of separation, as long as the ASS has the required mathematical properties.

2.2 Orientation of an ASS

An orientation of an ASS (S,≤,*) is a subset O of S that consists of precisely one of s, s* for every separation s∈S.

The two separations s and s* should be thought of as signposts pointing in opposite directions. Suitable subsets of an ASS will be used to point towards an interesting feature or cluster in a data set. To do so, such a subset should not contain both s and s* (if distinct), as these point in opposite directions. An orientation avoids this. Still, orientations need to satisfy more requirements to point towards features in the data in a meaningful way. This will be addressed below.

In the bipartition model, an orientation of the corresponding ASS picks one of every pair of (A, B) and (B, A) contained in S.

2.3 Order Function

A separation s in an ASS (S,≤,*) represents some way to split the data into two (possibly overlapping) parts. Not all such splits in the data are equally natural. In the image of a face a split cutting right across the nose will be less natural than a split that separates the eyes from the rest of the face. In data on the shopping habits of consumers a split that singles out pet owners will be more natural and more useful than some random separation. To measure how natural a separation is one can use an order function (defined below). We stress, however, that an order function, while convenient in many applications, is not an essential part of the invention. The method does not require an order function. Even without one the method can still capture and detect clusters in data.

The idea is that the order of a separation s is small if it splits the data in a natural way, while the order should be large if that is not the case. Importantly, it can be possible to identify such natural separations of a large data set without a preconceived notion of what might be its features. Indeed, the method described here can serve to define features of the data set from the mere knowledge of what are its natural separations.

Formally, any function $s \mapsto |s|$ on S is an order function if $|s|=|s^*|$ for all s∈S. The order function is submodular if $$|r \vee s|+|r \wedge s| \leq |r|+|s|$$

for all r, s∈S.

For different data sets different order functions will be suitable. Even just for image analysis, different order functions are useful. For illustrative purposes first a simple order function is introduced and then one that is slightly more sophisticated.

If two pixels p, q in P have the same x-coordinate but differ in the y-coordinate by exactly one or if they differ in their x-coordinate by exactly one but have the same y-coordinate, then p and q are adjacent. For any set A of pixels we define $$\partial A = \{\{p,q\}: p \in A \text{ and } q \in P \backslash A \text{ are adjacent}\}.$$

The set ∂A then represents the pairs of pixels on the boundary of A.

Furthermore a function $\delta(p, q)$ is defined that measures how like or unlike the pixels p and q are. Again there are many possible choices for $\delta$, some of which will be more adapted to some application than others. We assume that p and q are encoded as vectors whose entries are the attributes of the pixels, such as brightness, colour and so on. A simple definition of $\delta$ is then $$\delta(p,q)=\|p-q\|,$$

where $\|x\|$ denotes a suitable norm, for instance the euclidean norm. It might also be useful to modify $\delta$ in such a way that small differences are entirely neglected. That is, a cut-off parameter $\epsilon>0$ is fixed and $\delta$ defined as $$\delta(p, q) = \begin{cases} \|p - q\| & \text{if } \|p - q\| \geq \epsilon \\ 0 & \text{if } \|p - q\| < \epsilon \end{cases}$$

We describe two order functions based on such difference measures $\delta$. For the first and simpler one another parameter N needs to be fixed. This N needs to be some positive value large enough such that $\delta(p, q) \leq N$ for all adjacent pixels p, q. Then for (A, B) in the ASS:

$$|(A, B)| = \sum_{\{p,q\} \in \partial A} (N - \delta(p, q)) \quad (1)$$

A less simple order is defined via a Gaussian kernel, a standard concept in cluster analysis:

$$|(A, B)| = \sum_{\{p,q\} \in \partial A} e^{\frac{1}{2}\|p-q\|^2} = \sum_{\{p,q\} \in \partial A} e^{\frac{1}{2}\delta(p,q)^2}, \quad (2)$$

if $\delta$ is defined as $\delta(p, q)=\|p-q\|$. Clearly, the definition of the order function in (2) makes also sense for other choices of $\delta$. But note that, in this example, $\delta$ is used only for a few pairs {p, q} of pixels. In fact, it is an important feature of ASS-based cluster analyis that it can often identify clusters without the need for any distance function on the data set.

For the example of survey data (see end of Section 2.1), a simple (and submodular) order function would be the size of the overlap: $|(A, B)|=|A \cap B|$. The motivation for defining the order function in this way is that a question about which most people have a strong opinion is a good way to separate consumers into two parts. Note that, unlike in our image analysis example, this order function on the separations (ie, the questions asked) does not depend on a distance function on the set V of people polled.

Why is the number of undecided people useful as an order function? Consider garlic and toast. A lot of people have a strong opinion about garlic: many people love it, many people detest it but only few cannot make up their mind about garlic. Toast, on the other hand, appears to elicit much less passionate responses: yes, there are some people that are very fond of toast, there are also some that hate it, but arguably most people are neither very keen on toast nor show any particular dislike towards toast. Thus, the answers to "do you like garlic?" tell us something about almost all of V, while "do you like toast" only gives information on a small part of V.

Again, in general, the invention does not require the use of an order function. What is necessary is a way to decide whether a separation represents a natural split of the data or not.

The order function serves to evaluate how natural a split in the data is. In the analysis of data it is therefore advantageous to only consider all separations (in a universe) up to a specific order k. In a digital image, we might thus look at all separations in the bipartition model with on order less than k: if k is not too large and not too small then these separations will include all the bipartitions that split the image along natural lines, while those of large order will cut across the image in a more random fashion, or even in undesirable ways, i.e., through the nose.

Given a universe (U, ≤, *) with an order function $s \mapsto |s|$ on U and an k we define $$S_k = \{s \in U : |s| < k\}.$$

Note that these abstract separation systems $S_k$ are submodular if the order function $s \mapsto |s|$ on U is submodular.

2.4 Abstract Tangles and Consistency Requirements

The paradigm shift that lies at the heart of the invention is that consistent orientations of an ASS defined on the data can be thought of as (defining) clusters even when there is no informal notion of a cluster that merely has to be captured by a machine. What then does it mean for an orientation to be consistent? As an orientation, 0 cannot contain both s and s* (if they're distinct). This makes sense, since s and s* are understood as pointing in opposite directions—clearly, the feature cannot reside in two opposite directions at once.

A similar situation arises for two separations s and t with s<t. Then s and t are understood as pointing in the same general direction. Therefore, an orientation O that represents a feature should not contain s* and t, as these point in different directions.

Formally, an orientation O of an ASS (S,≤,*) is consistent if for no two distinct separations s,t with s<t it holds that s*, t∈O. If an orientation represents a feature in the data then it should better be consistent. That alone, however, is normally not enough.

A set of consistency requirements, or CRs for short, is a set $\mathcal{F}$ of subsets of the ASS. The set $\mathcal{F}$ should be thought of as disallowed configurations. That is, if O is an orientation such that no $F \in \mathcal{F}$ is a subset of O then O should be consistent.

Normally, the CRs include at least those subsets that enforce consistency in the sense above: all the sets of the form $$\{s^*,t\} \text{ for } s<t, s, t \in S \quad (3)$$

are included in $\mathcal{F}$.

A useful consistency requirement is the profile requirement. For this, the ASS (S,≤,*) needs to be embedded in a universe U. Then the profile requirement consists of all sets of the form $$\{r^*, s, r^* \wedge s^*\} \text{ for } r, s \in U$$

together with all the sets of the form as in (3). The profile requirements are often a minimal set of forbidden configurations: most sets of CRs include them, but they may include more forbidden configurations.

Given a universe with an order function, the robustness CRs include all sets of the form $$\{r^* \wedge s, r^* \wedge s^*, r, s\} \text{ where } |r^* \wedge s|, |r \wedge s^*| < |r| < |s|$$

for separations r, s.

In the bipartition model, a consistent orientation O of the relevant ASS satisfies the profile requirement if it follows from $(A, B) \in O$ and $(C, D) \in O$ that $(B \cap D, A \cup C) \notin O$. Applied to image analysis, the idea here is that if B as well as D each contain most of a certain feature of the image, the nose of a face say, then this feature cannot also mostly reside in $A \cup C$.

Given CRs $\mathcal{F}$, an orientation T of an ASS $(S, \leq, *)$ is an abstract tangle (with respect to $\mathcal{F}$) if none of the subsets of T lie in $\mathcal{F}$. That is, the configurations forbidden by the CRs do not appear in T. An abstract tangle should be thought of as a set of sign posts consistently pointing towards a feature or cluster in the data. What kind of feature that is, and whether it is a meaningful feature at all, depends on the choice of CRs. Different types of data will need different types of CRs. Similarly, different choices of CRs for a given data set will capture different types of features of that data set, or define new features.

2.5 Example: Abstract Tangles in Image Analysis

In image analysis, single pixels or sets of few pixels almost never constitute a meaningful feature of the image. Thus, no abstract tangle should arise from a single pixel: for a given pixel p, the set of all bipartitions (A, B) in the bipartition model ASS such that $p \in B$ should not form an abstract tangle. To prevent this from happening, it is desirable to include all sets of the form $\{(P \setminus \{p\}, \{p\})\}$, where p ranges over the set P of all pixels, in the set of forbidden configurations. These sets alone are too weak to give an abstract tangle enough structure to actually point towards a feature in the image. One of many possible choices for a set of CRs in image analysis is:

1) excluding single pixels: $\{(P \setminus \{p\}, \{p\})\}$ for all pixels $p \in P$;
2) excluding all void 3-stars: $\{(A, B), (C, D), (E, F)\}$, where (A, B), (C, D), (E, F) are bipartitions of P such that $B \cap D \cap F = $; and We remark that 1) and 2) imply the profile and robustness requirements if the ASS is submodular.

To illustrate the concept of an abstract tangle, the digital image in FIG. 1 is considered. To make the discussion simple the pixels are assumed to be 1-bit values, with value 0 if the pixel is white and value 1 if the pixel is black.

As underlying ASS the bipartition model is used, equipped with the simple order function as in (1), with the parameter N fixed to 1. Let L be the set of all black pixels. There are only four separations of order 0, namely the separations $(P \setminus L, L)$ and $(L, P \setminus L)$ and the separations $(, P)$ and $(, P)$.

The separation $(P \setminus L, L)$ points towards the letter L in the foreground, while $(L, P \setminus L)$ points to the background.

We fix as the set of CRs as above, that is, as in 1) and in 2). Recall that $S_k$ is the set of all bipartitions here that have order less than k. Correspondingly, $S_1$ admits only two abstract tangles, namely the tangle $$\rho = \{(, P), (P \setminus L, L)\}$$

and the abstract tangle $$\rho' = \{(P, ), (L, P \setminus L)\}$$

While $\rho$ represents the letter L, the other abstract tangle, $\rho'$, represents the background.

Assuming that the L is 10 pixels wide where it is thinnest at the bottom, its right serif is represented by abstract tangle of $S_{11}$:

$$\sigma = \{(P \setminus L, L), (P \setminus B_1, B_1), \ldots, (P \setminus B_n, B_n), (C_1, P \setminus C_1), \ldots, (C_m, P \setminus C_m)\},$$

where $B_1 \supset \ldots \supset B_n$ are the subsets of L that contain the right serif and have order 10, i.e., whose boundary contains only 10 pairs of like pixels (which are both black), and the $C_i$ are small sets of pixels, such that each $(C_i, P \setminus C_i)$ has order at most 10.

It is important to note that the right serif here is not described as a precise set of pixels. Rather, for every small order separation the abstract tangle σ describes in which part the "majority" of the serif can be found, even if small parts of it lie in the other part. The abstract tangle is, in this sense, a fuzzy description of the right serif.

2.6 Abstract Tree Sets and Distinguishing Property

Two separations s, t in an ASS are nested if $s \leq t$ or $s^* \leq t$ or $s \leq t^*$ or if $s^* \leq t^*$ holds. The ASS $(S, \leq, *)$ is nested if every two of the separations in S are nested.

In the bipartition model, two bipartitions (A, B) and (C, D) are nested if $A \subseteq C$ or $A \subseteq D$ or $B \subseteq C$ or if $B \subseteq D$.

An abstract tree set, or ATS for short, is a nested ASS without trivial or degenerate separations. A separation r is trivial if there is a separation s in the ASS such that $r < s$ and also $r < s^*$. A separation r is degenerate if $r = r^*$.

In the bipartition model, there is only one potentially trivial bipartition, namely $(, P)$. There is no degenerate separation.

Two abstract tangles T and T' are distinguished by separations s and $s^*$ if $s \in T$ while $s^* \in T'$. If T and T' are interpreted as clusters in the data, then s points towards the cluster T while T' lies on the other side of s, namely in direction of $s^*$. If for two abstract tangles T and T' there is an s that distinguishes T from T' then T and T' are distinguishable. An ASS $(S, \leq, *)$ distinguishes T and T' if there is an $s \in S$ that distinguishes T from T'.

An ASS with a set of CRs satisfies the distinguishing property if there is an abstract tree set such that every two distinguishable abstract tangles are distinguished by the ATS.

2.7 Duality Property

If $(S, \leq, *)$ is a nested ASS then a subset a of S is a splitter of S if S has a consistent orientation O such that its maximal elements (with respect to $\leq$) is precisely σ.

Let $\mathcal{F}$ be a set of CRs for an ASS $(S, \leq, *)$. An abstract tree set T contained in the ASS is an abstract tree set over $\mathcal{F}$ if all its splitters lie in $\mathcal{F}$.

An ASS $(S, \leq, *)$ together with a set $\mathcal{F}$ of CRs has the duality property if $(S, \leq, *)$ admits an abstract tangle (with respect to $\mathcal{F}$) or contains an abstract tree set over $\mathcal{F}$ but not both.

A tree set over some set $\mathcal{F}$ of CRs can be represented with the help of a graph-theoretical tree.

For a graph-theoretical tree T, define $\vec{E}(T)$ a $$\vec{E}(T) = \{(u, v) : u \text{ and } v \text{ adjacent in } T\}.$$

Thus, $\vec{E}(T)$ may be seen as the set of all possible orientations of the edges of T. Let $(S, \leq, *)$ be an ASS. An S-tree is a graph-theoretical tree T together with a mapping $a: \vec{E}(T) \to S$ such that $$a(u, v)^* = a(v, u) \text{ for all } (u, v) \in \vec{E}(T)$$

If $\mathcal{F}$ is a set of subsets of S (normally $\mathcal{F}$ is a set of CRs) then T together with a is an S-tree over $\mathcal{F}$ if it is an S-tree such that $$\{a(x, t) : (x, t) \in \vec{E}(T)\} \in \mathcal{F}$$

for all nodes t of the tree T and, if for all t, all the separations a(x,t) are distinct. One can show that for all abstract tree sets $\tau$ over a set $\mathcal{F}$ there is an S-tree T over $\mathcal{F}$ such that $\tau=\{a(u, v):(u, v)\in \vec{E}(T)\}$.

Conversely, given an S-tree T over a set $\mathcal{F}$ of sets of nested nontrivial separations pointing towards each other, the set $$\{a(u,v):(u,v)\in \vec{E}(T)\}$$

is an abstract tree set over $\mathcal{F}$. Here, two separations r, s point towards each other if $r\leq s^*$.

3 CONDITIONS THAT GUARANTEE THE DISTINGUISHING AND THE DUALITY PROPERTY

There are many quite different ways examples of abstract separation systems, as well as of consistency requirements. We found that, if they are defined in a sensible way (as would be desirable in a cluster analysis setting anyway), often the distinguishing property and duality property are satisfied. We treat the distinguishing property first.

Let U be a universe of separations. Then U is distributive if $$r\wedge(s\vee t)=(r\wedge s)\vee(r\wedge t)$$

for all r, s, t in the universe. Let $\mathcal{O}$ be a set of orientations of an ASS $(S,\leq,^*)$ embedded in the universe U. Then S scatters $\mathcal{O}$ if for all (non-nested) r, s $\in$ S such that there are O, O'$\in \mathcal{O}$ with r, s$\in$O and r*, s*$\in$O' there is a t$\in$O such that $r\vee s\leq t$.

A very general set of CRs is that of small 3-stars: this is the set of the configurations (3) enforcing consistency together with all sets of the form $$\{r,s,t\} \text{ such that } r^*\wedge s^*\wedge t^* \text{ is small,}$$

where a separation x is small if $x\leq x^*$. For example, all void 3-stars in the bipartition model are small 3-stars.

Theorem 1 (Tangle-tree theorem). Let $(S,\leq,^*)$ be an ASS in a distributive universe equipped with the small 3-stars CRs, and let $\mathcal{O}$ be a set of abstract tangles. If S scatters $\mathcal{O}$ then there exists an abstract tree set that distinguishes $\mathcal{O}$.

In a submodular universe an even stronger result can be obtained. An orientation O of an ASS is regular if for no s$\in$O the inverse separation s* is small.

Theorem 2 (Tangle-tree theorem). Let $(U,\leq,^*)$ be a universe with a submodular order function equipped with the profile and robustness CRs. Then there is an abstract tree set that distinguishes all the distinguishable regular abstract tangles.

In both of these settings, the abtract tree set can be obtained in a way so that it is canonical: that means, so that the tree set obtained only depends on the structure of the universe and not of any order of the elements, their names etc. Isomorphic ASS will yield isomorphic abstract tree sets.

We now turn to the duality property. For this, call an ASS $(S,\leq,^*)$ that is embedded in a universe separable if for all $s_1$, $s_2\in S$, both nontrivial, there is a $s_0\in S$ with $s_1\leq s_0\leq s_2$ such that for all r$\in$S with $s_1\leq r$ it holds that $r\vee s_0\in S$.

Theorem 3 (Duality theorem). Let $(S,\leq,^*)$ be a separable ASS in a distributive universe equipped with the small 3-stars CRs $\mathcal{F}$. Then either S admits an abstract tangle, or it contains an abstract tree set over $\mathcal{F}$, but never both.

4 APPLICATIONS

Analysis of clusters in digital data is of substantial commercial interest. Clusters are a vague notion, and a good number of definitions of what a cluster should be have been proposed. Generally, a cluster should represent a cohesive structure, a structure of things that belong together. These things may be elements of the data set to be analysed. More generally, they may be things whose coherence is indicated by the data without themselves being such data.

We propose abstract tangles as a way to represent, an thus detect or define, clusters in data as well as clusters elsewhere of which the data provides evidence. The invention provides a unified framework to captures such clusters for very diverse types of data. To adapt the framework to any specific setting, a number of parameters are available: how to define the abstract separation system, an order function on the separations (optional), and a set of consistency requirements.

The set of consistency requirements (CRs) allows us to specify the kind of cohesion deemed to give rise to clusters. Our ability to choose the CRs lends flexibility to our method, as clusters in different contexts will be coherent in different ways. Note that, when we fix these CRs, we only need an intuition of cohesion in the relevant context: we do not have to have any concrete idea of what the clusters that this notion of cohesion gives rise to will look like. Indeed, sometimes the shape, or type, of clusters will emerge only as the result of applying our method.

Our method, thus, does not only lend itself to the identification of clusters of a known type, but also to the discovery of new kinds of clusters.

In this section we describe some types of application of our method that are likely to find instances in many different contexts.

4.1 Detect Innovative Types of Clusters

The invention allows to conceptually capture and detect innovative types of cluster that cannot as easily be described in other ways, e.g. as subsets of the given data set. Detecting clusters has applications in many fields.

A cluster may, for example, represent a new consumer group that was not evident before. Such a consumer group could then be targeted with specific marketing that addresses them directly.

A cluster might identify a coherent belief set held by some people but not by others, thereby assisting the identification of trends or ideologies that influence our behaviour. This can be significant in sociological or political studies.

4.2 Structure Identification

The canonical distinguishing property produces an abstract tree set that reflects the overall structure of the given data set in terms of the relative position of its clusters in a structure tree defined by the abstract tree set. It becomes possible to deduce to what degree two data sets are related, or come from similar sources.

The canonical distinguishing property yields isomorphic abstract tree sets whenever two ASS are fed into it that are isomorphic. (This could come about, for instance, if the two underlying data sets are structurally the same but are read into a computer in a different order.) Abstract tree sets coming from similar or the same objects will have large sub-tree sets that are isomorphic or nearly so.

An application would be in image recognition. A face, for instance, would be distinguished by a specific structure in the abstract tree set. A test whether this structure is present then effectively test whether the image probably shows a face or not. Other applications include music classification:

here a piece of music yields the underlying data set. A similar structure in the distinguishing abstract tree set is then an indication of a similar musical genre. Structure identification is obviously not restricted to image recognition or music classification but can be applied to diverse types of data.

4.3 Compression of Large Data Sets

If the clusters in the data describe the data in an essential way, that is, if in the application the clusters make up the most important part of the data, then the distinguishing property can be used to compress the data. The abstract tree set obtained via the distinguishing property has at most as many separations as the data has clusters. While the data may have many individual data points, and thus need a large part of a computer's memory to be stored, the number of clusters will be much smaller. The abstract tree set of the distinguishing property not only encapsulates the different clusters but also stores their relative position to each other. Together with each cluster a sample data point can be stored that represents a typical (or perhaps average) data value in the cluster.

In image analysis, the clusters represent features of the image, for instance the nose, eyes etc. of a face. The abstract tree set then encodes just these features and their position. To re-create an approximation of the original picture from just these features one can draw their outlines on a canvas and fill the areas between them with pixels similar to those in a small sample taken from the corresponding areas in the original image when the abstract tangles were computed. For every such area, its pixels are likely to be similar, so even a small sample should suffice to smooth out the gradual differences that can still occur within such an area.

4.4 Quantitative Cluster Assessment

Once a cluster is identified it is usually desirable to measure its characteristics. In the case of consumer data, for example, different metrics may yield deeper information on the cluster that in turn can guide different strategies how to address consumer represented by the cluster. In other applications, the metrics help telling features from noise. If noise can be eliminated, this results in a smaller and simpler data set. But features should be kept.

For quantitative cluster assessment an order function is needed. Consider abstract separation systems $S_k$ of separation of order less than a specific value k; see also Section 2.3. Then, with a suitably chosen k, real features in the data will be represented by abstract tangles of $S_k$, while parts of the data not represented by an abstract tangle will be unimportant background or noise. Given a universe (U,≤,*) of separations with an order function s↦|s| together with a set CRs, let ρ be an abstract tangle in some $S_k$. Then the complexity of ρ is the smallest k such that ρ is an abstract tangle in $S_k$. The coherence of ρ is the largest k for which ρ extends to a unique abstract tangle in $S_k$. The visibility of ρ is the difference between its coherence and its complexity.

The duality property allows us to offer a mathematically rigorous definition of the maximum resolution that a set A⊆P of pixels supports: the largest k for which it admits an abstract tangle in $S_k$, i.e., has an abstract tangle of coherence k.

For if we are interested in the potential features of an image handed to us as just a data set of pixels, then real features are likely to correspond to abstract tangles of coherence at least some k that we may specify, while areas not containing such an abstract tangle will be unimportant background, or 'noise', at this resolution k.

Note that this notion of resolution does not refer to how small our pixels are: these are assumed to be constant. What it measures is up to what degree of similarity an area of the picture blending with, or inserted within, another area can still be identified as a feature of the picture with some objective degree of certainty. In a nutshell, 'higher resolution' in our sense does not mean 'more pixels' (which we consider as given) but 'more features' read out of those pixels.

4.5 Advantages of the Invention

Computer based cluster analysis is essential in a number of fields of serious commercial interest. Cluster analysis plays a role, for example, in marketing, where consumer types are identified, in sentiment analysis of consumer generated texts, in image analysis, in the classification of audio data and even in the analysis of geophysical data in gas or oil exploration. In short, almost any field that yields a substantial amount of data can benefit from automated cluster analysis.

Abstract tangles are well-suited to represent clusters in data. First, unlike other definitions of clusters, the invention does not require a preconceived notion how precisely a cluster should look. Second, abstract tangles are fuzzy in nature. For a given data point it might be impossible to decide whether it is part of a cluster or not, yet it still might contribute to the existence of the cluster. A cluster might emerge from a number of ambiguous data points. The abstract tangles are not defined as precise subsets of the data set. The distinguishing property, and this is a third advantage, allows to nevertheless delineate the clusters. In the bipartition model, for example, the abstract tree set that distinguishes all distinguishable abstract tangles yields subsets that can be attributed clearly to the different abstract tangles. Finally, the duality property allows to detect when there are no coherent clusters present. This is in particular useful in conjunction with an order function. By considering the abstract separation systems $S_k$ for ever higher k, it becomes possible to determine a threshold at which there are no clusters (abstract tangles) anymore.

The mechanisms proposed lead to a computer-implemented method to analyse clusters in, or determined by, a set of data. While a brute-force approach, in which all possible orientations are generated, will normally be very costly in terms of computing time, numerous speed-ups are available for real-world data. If the ASS comes from a universe with a submodular order function, which will be the case in many real-world applications, partial orientations can usually be iteratively refined in a greedy manner. Other structural properties lead to more improvements in the performance of the computer-implemented method.

Consistency requirements may also be seen as a way to translate human insights of what should not constitute a cluster into a machine-accessible form. In image analysis it is intuitively clear that a single pixel should not give rise to a cluster. Casting this as in Section 2.5 in terms of consistency requirements allows a computer to exclude such trivial orientations as clusters.

5 EXAMPLES IN IMAGE ANALYSIS

Some of the concepts are illustrated in more depth in the context of image analysis. That is, the data set consists, as before, of a set P of pixels that we use to define a universe U of separations based on the bipartition model. We use the consistency requirements as defined in Section 2.5. To keep notation simple, an abstract tangle in $S_k$, the set of all separations in U of order less than k, is called a k-tangle.

In FIG. 2, let again δ assign 0 to boundary pairs joining different pixels, and 1 to edges joining like pixels (which exist only in the right square). Then the left square has no abstract tangles at all, since it can be crossed at no cost even by separations with long boundaries, and so we can it cut up into single pixels by nested separations all of order 0. The square on the right has two abstract tangles—the black and white corners opposite each other—while the middle stripe corresponds to no abstract tangle.

Now consider FIG. 3: a square with four quadrants, of which the left two and the right two are similar to each other.

With a natural weighting taking into account the similarity of colours, there is a unique (up to *) separation of lowest order k, which runs vertically down the middle. (We here ignore all the separations (A, P\A) with A a very small set, and their inverses.) This separation separates the green region A from the red region P\A, in the sense that it distinguishes their corresponding abstract tangles: the (k+1)-tangle that orients all separations of order at most k towards where most of the green pixels are orients this separation as (P\A, A), whereas the corresponding 'red' (k+1)-tangle orients it as (A, P\A).

The (abstract tangle of the) green region extends to distinct k'-tangles for some k'>k that correspond to the two green quadrants, and similarly for red. While the four quadrants are pairwise distinguishable, the green quadrants are not distinguishable from the entire green region, and similarly for red. If the two greens are quite similar to each other, the entire green region will have higher visibility than the two green squares. If the two greens differ, in hue, nearly as much from each other as they differ from the reds, the entire 'green' region A will be less visible than the two 'green' squares.

As the distinguishing property is satisfied, five nested separations can be computed to distinguish these abstract tangles: the vertical separation separating green from red, and in addition one L-shaped separation around each of the four quadrants.

FIG. 4 is intended to illustrate which separations have low order and which do not. The lowest-order sizable separations are defined by the innermost and the outermost circular split between differently coloured regions. The latter has low order, because all its boundary pixels pairs {p, q} join a blue pixel to a red one, making δ(p, q) large. The innermost circle has smaller values of δ(p, q), but fewer boundary pairs in total, making for a similarly low order. The remaining concentric circles mark differences in hue that are about equal in degree, so the longer of these circles have larger order as separations.

The separations cutting along radial lines in FIG. 4, by contrast, have maximum values of δ, since every boundary pixel pair joins two like pixels. Hence the blue background, the yellow innermost disc, and the red concentric bands are the only abstract tangles in this picture.

The inner red disc in picture in FIG. 5 is a highly visible abstract tangle, one of low complexity and large coherence: the order of any separation that roughly cuts it in half along a straight line and otherwise runs between differently coloured squares is a lower bound for its coherence.

The checkerboard background as such does not represent an abstract tangle. Roughly, the reason for this is that the separations cutting around it, such as the boundary of the red disc or any circle inside the red disc, have order no smaller than the separations cutting right through it: if these run between differently coloured squares, they will have similarly low order as the boundary of the red disc.

Each of the green and white squares does represent an abstract tangle. But both the complexity and coherence of such a 'square' abstract tangle is low: the order of a separation cutting around the square is essentially its complexity, while the order of the separation with the smallest boundary that cuts vertically through it and otherwise runs between different squares is essentially an upper bound for its coherence.

Indeed, if that order is k, then the chequered area has no non-trivial abstract tangle of coherence much greater than k at all. This is because we can subdivide it into single pixels by nested separations of order only slightly greater than k, chosen inductively: since separations of order k can cut right through a square, we may, at each step, subdivide any area still bigger than a single pixel by a separation that has order only slightly greater than k and is nested with all previously chosen separations. These nested separations will be separations forming, for some k' only slightly bigger than k, an $S_{k'}$-tree over the set $\mathcal{F}$ of void 3-stars and single pixels, which by duality property witnesses that the chequered area has no non-trivial abstract tangle of coherence at least k'.

In the left image of FIG. 6 we see a blue disc against a white background. Here we have two highly visible regions, of low complexity and high coherence, represented by abstract tangles, one pointing towards the blue discs, one pointing towards the background. In the second image on the right, imagine the background as consisting of blue and white pixels whose colours are chosen independently at random, with equal probability for blue and white. Note that an edge joining two of these random pixels is as likely to join pixels of the same colour as an edge on the circle around the blue disc, which joins a blue pixel to a random pixel. Hence, the central blue disc gives rise to an abstract tangle of high coherence, but—unlike in the left image—the background does not represent any abstract tangle at all, with high probability.

The invention claimed is:

1. A computer-implemented method of automatical image recognition in a set V of pixel values of a digital image, by way of completing the following steps:
   computing, from the set V, an abstract separation system (ASS) that consists of a finite set S, whose elements are called separations; of a pre-determined transitive, anti-symmetric and reflexive order relation ≤ on S; and of an order-reversing involution *:S→S, that is, a mapping s↦s* with the property that (s*)*=s and that r≤s implies s*≤r* for all r, s∈S;
   determining a set of consistency requirements (CRs), that is, a set, $\mathcal{F}$ of subsets of S, wherein the consistency requirements $\mathcal{F}$ are chosen in such a way that for the ASS(S, ≤, *) together with the chosen CRs $\mathcal{F}$ an abstract tree set A exists such that A distinguishes every pair T, T' of abstract tangles of S for which there exists a y∈S such that y∈T but y*∈T'; and computing the abstract tree set A;
   computing, from the ASS(S,≤, *), one or more abstract tangles of S, that is, one or more sets T⊆S that each contain exactly one of each pair {s, s*} for all s∈S, and do not contain any F∈$\mathcal{F}$ as a subset, and outputting T; or determining that S has no abstract tangle and outputting a subset R of S witnessing this;
all in such a way that any recognizable region C in the image determined by V determines, in a pre-specified way, for every s in S either s or s*; and at the same time in such a way that for every such C one of the tangles computed contains precisely the choice of s and s* that C determines, thereby capturing C as a recognizable region in V.

2. The computer-implemented method according to claim 1, the steps further comprising computing, with the same order relation $\leq$, involution *, and consistency requirements $\mathscr{F}$, from a second data set V' consisting of pixel values of a second digital image, a second ASS with a set S' of separations and an abstract tree set A' that distinguishes every distinguishable pair of abstract tangles of S';

determining a degree of structural similarity between the abstract tree sets A and A', as a measure for the similarity between the images from which the data sets V and V' were obtained and/or for the similarity of the contents of these images, and evaluating from the determined degree of structural similarity between the abstract tree sets A and A' whether the first and the second digital image contain one or more similar objects.

3. A computer-implemented method to compress, in the field of big data, a big data set V of discrete digital data by way of completing the following steps:

computing, from the set V, an abstract separation system (ASS) that consists of a finite set S, whose elements are called separations; of a pre-determined transitive, anti-symmetric and reflexive order relation $\leq$ on S; and of an order-reversing involution $*: S \rightarrow S$, that is, a mapping $s \mapsto *$ with the property that $(s*)*=s$ and that $r \leq s$ implies $s* \leq r*$ for all $r, s \in S$;

determining a set of consistency requirements (CRs), that is, a set $\mathscr{F}$ of subsets of S, wherein the consistency requirements $\mathscr{F}$ are chosen in such a way that for the ASS(S, $\leq$, *) together with the chosen CRs $\mathscr{F}$ an abstract tree set A exists such that A distinguishes every pair T, T' of abstract tangles of S for which there exists a $y \in S$ such that $y \in T$ but $y* \in T'$; and computing the abstract tree set A;

computing, from the ASS(S,$\leq$, *), one or more abstract tangles of S, that is, one or more sets $T \subseteq S$ that each contain exactly one of each pair $\{s, s*\}$ for all $s \in S$, and do not contain any $F \in \mathscr{F}$ as a subset, and outputting T; or determining that S has no abstract tangle and outputting a subset R of S witnessing this;

all in such a way that any cluster C in V determines, in a pre-specified way, for every s in S either s or s*; and at the same time in such a way that for every such C one of the tangles computed contains precisely the choice of s and s* that C determines, thereby capturing C as a cluster in V; and evaluating relative positions of the computed abstract tangles from the abstract tree set A; and storing said relative positions as well as a small sample of data points from each abstract tangle, thereby obtaining a lossily compressed version of the data set V.

4. A computer-implemented method to automatically recognize commonly held views of polled individuals represented in a data set V, by way of completing the following steps:

computing, from the set V, an abstract separation system (ASS) that consists of a finite set S, whose elements are called separations; of a pre-determined transitive, anti-symmetric and reflexive order relation $\leq$ on S; and of an order-reversing involution $*: S \rightarrow S$, that is, a mapping $s \mapsto s*$ with the property that $(s*)*=s$ and that $r \leq s$ implies $s* \leq r*$ for all $r, s \in S$;

determining a set of consistency requirements (CRs), that is, a set $\mathscr{F}$ of subsets of S;

computing, from the ASS(S,$\leq$, *), one or more abstract tangles of S, that is, one or more sets $T \subseteq S$ that each contain exactly one of each pair $\{s, s*\}$ for all $s \in S$, and do not contain any $F \in \mathscr{F}$ as a subset, and outputting T; or determining that S has no abstract tangle and outputting a subset R of S witnessing this;

all in such a way that any commonly held view of the polled individuals is represented by a respective cluster C in V, which cluster C determines, in a pre-specified way, for every s in S either s or s*; and at the same time in such a way that for every such C one of the tangles computed contains precisely the choice of s and s* that C determines, thereby capturing C as a cluster in V and thus recognizing the commonly held view represented by C, wherein the set S of separations consists of pairs (A, B), each separation pair (A, B) and (B, A) corresponding to a question posed to the individuals, such that A is the set of individuals with an affirmative or neutral answer and B is the set of individuals with a negative or neutral answer to the question, and wherein the way in which a cluster C in V is deemed to determine one of an inverse pair s=(A,B) and s*=(B,A) of separations is that if more of C lies in A than in B then C determines s*, while if more of C lies in B than in A then C determines s; if C has equal parts in A and in B then s will not be oriented by any tangle designed to formalize C.

5. The computer-implemented method according to claim 4, wherein the consistency requirements $\mathscr{F}$ are chosen in such a way that for the ASS(S, $\leq$, *) together with the chosen CRs $\mathscr{F}$ a set A exists such that A distinguishes every distinguishable pair T, T' of abstract tangles of S, i.e., every pair T, T' of abstract tangles of S for which there exists a $y \in S$ such that $y \in T$ but $y* \in T'$, wherein:

A is an abstract tree set, i.e., a subset of S such that $s \in A$ implies $s* \in A$ for every $s \in A$, such that $r \leq s$, $r \leq s*$, $r* \leq s$ or $r* \leq s*$ holds for any two $r, s \in A$, such that A contains no element r for which there is an $s \in S$ with $r < s$ and also $r < s*$ and such that A contains no element r with $r = r*$; and wherein such a set A is computed.

6. The computer-implemented method according to claim 4, further comprising pre-determining an order function $s \mapsto |s|$ on S, such that $|s| \geq 0$ for every $s \in S$ and such that $|s| = |s*|$, that measures how natural a separation s of the data is;

limiting, before the computing of any abstract tangle or any abstract tree set, the set S of separations to the subset $S_k$ of those $s \in S$ with $|s| < k$, wherein k is a chosen threshold value; and computing characteristics based on the orders of the separations in at least one abstract tangle T representing a cluster, such as the complexity of the cluster, its cohesion or its visibility, wherein:

the complexity of a cluster is the smallest number k such that C induces an abstract tangle of the set $S_k$ that is not induced by any cluster C' that is not part of C or contains C;

the cohesion of the cluster C is the largest number k such that C induces an abstract tangle of $S_k$ and this tangle is also induced by all the subclusters of C if any; and the visibility of a cluster is the difference between its cohesion and its complexity.

7. A computer-implemented method to automatically recognize types of consumers, represented in a purchasing data set V, by way of completing the following steps:

computing, from the set V, an abstract separation system (ASS) that consists of a finite set S, whose elements are called separations; of a pre-determined transitive, antisymmetric and reflexive order relation ≤ on S; and of an order-reversing involution *:S→S, that is, a mapping s↦s* with the property that (s*)*=s and that r≤s implies s*≤r* for all r, s∈S;

determining a set of consistency requirements (CRs), that is, a set $\mathscr{F}$ of subsets of S;

computing, from the ASS(S,≤, *), one or more abstract tangles of S, that is, one or more sets T⊆S that each contain exactly one of each pair {s, s*} for all s∈S, and do not contain any F∈$\mathscr{F}$ as a subset, and outputting T; or determining that S has no abstract tangle and outputting a subset R of S witnessing this;

all in such a way that any type C of consumers respectively, determines, in a pre-specified way, for every s in S either s or s*; and at the same time in such a way that for every such C one of the tangles computed contains precisely the choice of s and s* that C determines, thereby recognizing as a type of consumers, respectively, in V.

8. The computer-implemented method according to claim 7, wherein the consistency requirements $\mathscr{F}$ are chosen in such a way that for the ASS(S, ≤, *) together with the chosen CRs $\mathscr{F}$ a set A exists such that A distinguishes every distinguishable pair T, T' of abstract tangles of S, i.e., every pair T, T' of abstract tangles of S for which there exists a y∈S such that y∈T but y*∈T', wherein:

A is an abstract tree set, i.e., a subset of S such that s∈A implies s*∈A for every s∈A, such that r≤s, r≤s*, r*≤s or r*≤s* holds for any two r, s∈A, such that A contains no element r for which there is an s∈S with r<s and also r<s* and such that A contains no element r with r=r*;

and wherein such a set A is computed.

9. The computer-implemented method according to claim 7, further comprising pre-determining an order function s↦|s| on S, such that |s|≥0 for every s∈S and such that |s|=|s*|, that measures how natural a separation s of the data is;

limiting, before the computing of any abstract tangle or any abstract tree set, the set S of separations to the subset $S_k$ of those s∈S with |s|<k, wherein k is a chosen threshold value; and computing characteristics based on the orders of the separations in at least one abstract tangle T representing a type, such as the complexity of the type, its cohesion or its visibility, wherein:

the complexity of a type is the smallest number k such that C induces an abstract tangle of the set $S_k$ that is not induced by any type C' that is not part of C or contains C;

the cohesion of the type C is the largest number k such that C induces an abstract tangle of $S_k$ and this tangle is also induced by all subtypes of C if any; and the visibility of a type is the difference between its cohesion and its complexity.

10. A computer-implemented method to automatically recognize types of audio files represented in a data set V, by way of completing the following steps:

computing, from the set V, an abstract separation system (ASS) that consists of a finite set S, whose elements are called separations; of a pre-determined transitive, antisymmetric and reflexive order relation ≤ on S; and of an order-reversing involution *:S→S, that is, a mapping s↦s* with the property that (s*)*=s and that r≤s implies s*≤r* for all r, s∈S;

determining a set of consistency requirements (CRs), that is, a set $\mathscr{F}$ of subsets of S;

computing, from the ASS(S,≤, *), one or more abstract tangles of S, that is, one or more sets T⊆S that each contain exactly one of each pair {s, s*} for all s∈S, and do not contain any F∈$\mathscr{F}$ as a subset, and outputting T; or determining that S has no abstract tangle and outputting a subset R of S witnessing this;

all in such a way that any type of the audio files, respectively, is represented by a respective cluster C in V which determines, in a pre-specified way, for every s in S either s or s*; and at the same time in such a way that for every such C one of the tangles computed contains precisely the choice of s and s* that C determines, thereby capturing C as a cluster in V and thus recognizing the type represented by C.

11. The computer-implemented method according to claim 10, wherein the consistency requirements $\mathscr{F}$ are chosen in such a way that for the ASS(S, ≤, *) together with the chosen CRs $\mathscr{F}$ set A exists such that A distinguishes every distinguishable pair T, T' of abstract tangles of S, i.e., every pair T, T' of abstract tangles of S for which there exists a y∈S such that y∈T but y*∈T', wherein:

A is an abstract tree set, i.e., a subset of S such that s∈A implies s*∈A for every s∈A, such that r≤s, r≤s*, r*≤s or r*≤s* holds for any two r, s∈A, such that A contains no element r for which there is an s∈S with r<s and also r<s* and such that A contains no element r with r=r*;

and wherein such a set A is computed.

12. The computer-implemented method according to claim 10, further comprising pre-determining an order function s↦|s| on S, such that |s|≥0 for every s∈S and such that |s|=|s*|, that measures how natural a separation s of the data is;

limiting, before the computing of any abstract tangle or any abstract tree set, the set S of separations to the subset $S_k$ of those s∈S with |s|<k, wherein k is a chosen threshold value; and computing characteristics based on the orders of the separations in at least one abstract tangle T representing a cluster, such as the complexity of the cluster, its cohesion or its visibility, wherein:

the complexity of a cluster is the smallest number k such that C induces an abstract tangle of the set $S_k$ that is not induced by any cluster C' that is not part of C or contains C;

the cohesion of the cluster C is the largest number k such that C induces an abstract tangle of $S_k$ and this tangle is also induced by all the subclusters of C if any; and the visibility of a cluster is the difference between its cohesion and its complexity.

13. A computer-implemented method to automatically recognize topics of texts represented in a data set V, by way of completing the following steps:

computing, from the set V, an abstract separation system (ASS) that consists of a finite set S, whose elements are called separations; of a pre-determined transitive, antisymmetric and reflexive order relation ≤ on S; and of an order-reversing involution *:S→S, that is, a mapping s↦s* with the property that (s*)*=s and that r≤s implies s*≤r* for all r, s∈S;

determining a set of consistency requirements (CRs), that is, a set $\mathscr{F}$ of subsets of S;

computing, from the ASS(S,≤, *), one or more abstract tangles of S, that is, one or more sets T⊆S that each contain exactly one of each pair {s, s*} for all s∈S, and do not contain any F∈$\mathscr{F}$ as a subset, and outputting T; or determining that S has no abstract tangle and outputting a subset R of S witnessing this;

all in such a way that any topic of the texts, respectively, is represented by a respective cluster C in V which determines, in a pre-specified way, for every s in S either s or s*;

and at the same time in such a way that for every such C one of the tangles computed contains precisely the choice of s and s* that C determines, thereby capturing C as a cluster in V and thus recognizing the topic represented by C.

14. The computer-implemented method according to claim 13, wherein the consistency requirements $\mathscr{F}$ are chosen in such a way that for the ASS(S, ≤, *) together with the chosen CRs $\mathscr{F}$ a set A exists such that A distinguishes every distinguishable pair T, T' of abstract tangles of S, i.e., every pair T, T' of abstract tangles of S for which there exists a y∈S such that y∈T but y*∈T', wherein:

A is an abstract tree set, i.e., a subset of S such that s∈A implies s*∈A for every s∈A, such that r≤s, r≤s*, r*≤s or r*≤s* holds for any two r, s∈A, such that A contains no element r for which there is an s∈S with r<s and also r<s* and such that A contains no element r with r=r*;

and wherein such a set A is computed.

15. The computer-implemented method according to claim 13, further comprising pre-determining an order function s↦|s| on S, such that |s|≥0 for every s∈S and such that |s|=|s*|, that measures how natural a separation s of the data is;

limiting, before the computing of any abstract tangle or any abstract tree set, the set S of separations to the subset $S_k$ of those s∈S with |s|<k, wherein k is a chosen threshold value; and computing characteristics based on the orders of the separations in at least one abstract tangle T representing a cluster, such as the complexity of the cluster, its cohesion or its visibility, wherein:

the complexity of a cluster is the smallest number k such that C induces an abstract tangle of the set $S_k$ that is not induced by any cluster C' that is not part of C or contains C;

the cohesion of the cluster C is the largest number k such that C induces an abstract tangle of $S_k$ and this tangle is also induced by all the subclusters of C if any; and the visibility of a cluster is the difference between its cohesion and its complexity.

* * * * *